(12) United States Patent
Hollman et al.

(10) Patent No.: US 7,146,000 B2
(45) Date of Patent: Dec. 5, 2006

(54) ROUTING ENGINE FOR TELECOMMUNICATIONS NETWORK

(75) Inventors: Brett P. Hollman, Louisville, CO (US); Jeffrey L. Martin, Frederick, CO (US); George T. Joseph, Denver, CO (US); Alex J. Henes, Denver, CO (US); Christopher M. Bonewitz, Golden, CO (US); Kaveh Asalian, Broomfield, CO (US); Geoff R. Yaworski, Denver, CO (US); Gary L. Ryczek, Denver, CO (US); Colin G. Train, Aurora, CO (US)

(73) Assignee: Level (3) Communications, Broomfield, CO (US)

(*) Notice: Subject to any disclaimer, the term of this patent is extended or adjusted under 35 U.S.C. 154(b) by 931 days.

(21) Appl. No.: 10/057,362

(22) Filed: Jan. 25, 2002

(65) Prior Publication Data

US 2003/0142808 A1 Jul. 31, 2003

(51) Int. Cl.
*H04M 7/00* (2006.01)
*H04L 12/28* (2006.01)

(52) U.S. Cl. .................. 379/221.06; 370/254

(58) Field of Classification Search ..............
379/221.06–221.07, 114.02, 201.12; 709/220, 709/238, 241; 370/238, 238.1, 254–256
See application file for complete search history.

(56) References Cited

U.S. PATENT DOCUMENTS

| | | | | |
|---|---|---|---|---|
| 5,291,477 A | * | 3/1994 | Liew | 370/238 |
| 5,337,352 A | * | 8/1994 | Kobayashi et al. | 379/234 |
| 5,402,478 A | * | 3/1995 | Hluchyj et al. | 379/221.01 |
| 5,586,254 A | | 12/1996 | Kondo et al. | |
| 5,596,719 A | | 1/1997 | Ramakrishnan et al. | 395/200.2 |
| 5,680,448 A | * | 10/1997 | Becker | 379/221.07 |
| 5,809,282 A | | 9/1998 | Cooper et al. | |
| 5,841,759 A | | 11/1998 | Russ et al. | |
| 5,963,544 A | | 10/1999 | Ding et al. | 370/238 |

(Continued)

FOREIGN PATENT DOCUMENTS

EP 0 568 477 A2 11/1993

(Continued)

OTHER PUBLICATIONS

Whay C. Lee et al., Routing Subject to Quality of Service Constraints in Integrated Communication Networks, IEEE Network, Jul./Aug. 1995, pp. 3-6, 20-23, No. 4, New York, US.

(Continued)

*Primary Examiner*—Benny Q. Tieu
(74) *Attorney, Agent, or Firm*—Faegre & Benson LLP

(57) ABSTRACT

A system for automated installation of a communication line using an optimal route between a source location and a destination location is disclosed. The system includes a routing engine providing an automated design process for rendering the optimal route. The routing engine utilizes a routing algorithm to select the optimal route from a graph of capacity links defining a plurality of possible routes between the source and destination locations. If, at any time during the design process, the optimal route or capacity links defining the optimal route are detected as unavailable for any reason, the routing engine re-initiates the design process and thereafter selects a new optimal route based upon a new capacity graph built without the previously unavailable capacity link. Once designed, the available optimal route is provided to a command and control engine, which, in turn, manages the installation of the communication line using the optimal route. The command and control engine manages the process for assigning the optimal route in the provisioning system.

32 Claims, 7 Drawing Sheets

U.S. PATENT DOCUMENTS

| | | | |
|---|---|---|---|
| 6,058,103 | A | 5/2000 | Henderson et al. .......... 370/254 |
| 6,061,332 | A | 5/2000 | Branton, Jr. et al. ........ 370/241 |
| 6,134,671 | A | 10/2000 | Commerford et al. |
| 6,185,193 | B1 | 2/2001 | Kawakami et al. .......... 370/254 |
| 6,240,463 | B1 | 5/2001 | Benmohamed et al. ..... 709/238 |
| 6,262,974 | B1 | 7/2001 | Chevalier et al. ........... 370/232 |
| 6,301,244 | B1 | 10/2001 | Huang et al. |
| 6,603,742 | B1 | 8/2003 | Steele, Jr. et al. |
| 6,948,101 | B1 | 9/2005 | Saito |
| 2002/0018264 | A1* | 2/2002 | Kodialam et al. .......... 359/128 |
| 2002/0045453 | A1* | 4/2002 | Juttner et al. ................ 455/445 |
| 2002/0143872 | A1 | 10/2002 | Weiss et al. |
| 2002/0187770 | A1* | 12/2002 | Grover et al. .............. 455/403 |
| 2003/0005149 | A1* | 1/2003 | Haas et al. .................. 709/238 |
| 2003/0099014 | A1* | 5/2003 | Egner et al. ................ 359/124 |

FOREIGN PATENT DOCUMENTS

| | | |
|---|---|---|
| EP | 0 926 860 A2 | 6/1999 |
| EP | 1 014 627 A1 | 6/2000 |
| EP | 1 263 260 | 12/2002 |
| WO | WO 99/21336 | 4/1999 |
| WO | WO 01/86435 | 11/2001 |
| WO | WO 02/19135 | 3/2002 |
| WO | WO 01/41578 | 5/2002 |

OTHER PUBLICATIONS

Tenenbaum A S, Shortest Path Routing, Computer Networks (1996), Prentice-Hall International, pp. 348-365, London, GB.

Barberis G et al., A Shortest Route Algorithm for Graphs Having Weighted Nodes and Arcs With Application to S/F Communication Networks, CSELT Rapporti Tecnici, (1977), pp. 63-68, vol. 5, No. 1, Turin, IT.

Dijkstra E W, Note On Two Problems In Connexion With Graphs, Numerische Mathematik, Springer Verlag (1959), pp. 269-271, vol. 1, Berlin, DE.

Ishiwa, Nobumasa, et al., "An Expert System for Planning Private Networks," UDC 681.3.02:658.512.2.011.56:621.395.4 NEC Res. & Develop., vol. 35 No. 3, Jul. 1994.

Doshi, B. T., et al., "Overview of InDT-A New Tool for Next Generation Network Design" 0-7803-2509-May 1995 IEEE, pp. 1942-1946.

* cited by examiner

ROUTING ENGINE FOR TELECOMMUNICATIONS NETWORK

CROSS REFERENCE TO RELATED APPLICATIONS

This application is related to subject matter disclosed in U.S. patent application for an AUTOMATED INSTALLATION OF NETWORK SERVICE IN A TELECOMMUNICATIONS NETWORK, Ser. No. 10/057,041, filed concurrently herewith, the subject matter of which is incorporated in this application by reference.

TECHNICAL FIELD

This invention relates to a routing engine for a telecommunications network. More particularly, this invention relates to finding an optimal route from source to destination including connections at the source, destination, and all intermediate locations.

BACKGROUND OF THE INVENTION

Routing a communication line for a telecommunications network is a manual process involving many complicated steps. After a customer's service request for a communication line is received by a telecommunications company that is hired to install the line, the design process begins. First, a designer selects a path that he\she deems the best path to accommodate the circuit. This may be a least cost route on the given network or this route may incur more cost than is necessary. The designer may run into many dead ends when designing a manual route because the route has many directions it may branch along the way. These directions may or may not have capacity links available to get the circuit from source to destination. This process may take much time and could yield a good to mediocre route. Furthermore, no assurances can be made to the customer until the above analysis is complete. Such a delay is not only a burden to the customer, but may cost the network provider the contract.

It is with respect to these considerations and others that the present invention has been made.

SUMMARY OF THE INVENTION

In accordance with the present invention, the above and other problems are solved by automating the design process for designing an optimal route for a private line circuit between a source and a destination location, as specified in a communication line installation request. Based on the current available capacity between the source location and the destination location, a routing engine automates the design of a least cost route for the private line circuit through a communications network. The routing engine then provides details of the route to a system managing the installation of the private line circuit.

In accordance with other aspects, the present invention relates to a routing process for designing an optimal route for a protected private line circuit between the source location and the destination location. The routing process identifies all possible capacity links between the source location and the destination location and thereafter filters the possible capacity links to a set of capacity links based on application of specific routing policy rules of an appropriate routing policy. Service type and bandwidth information dictate which specific routing policy rules to use. The routing process then builds a capacity graph including only the filtered set of capacity links between the source and the destination location. Next, the routing process applies Dijkstra's algorithm to the capacity graph to determine an optimal route of capacity links between the source and destination locations that would be the least cost route for installation. Weighting or placing a cost on each capacity link may be based on various factors and parameters, such as, without limitation, total distance between endpoints of the capacity link. A weight may also be placed on each cross connect that needs to be completed for a given route. After the optimal route is selected, the routing process determines whether the optimal route is available for use by the private line circuit. If available, the optimal route, including the specific capacity links used to design the route, is submitted to a command and control engine for installation of the optimal route. If, however, the optimal route is not available, the routing process is repeated until such an optimal route is found.

In accordance with still other aspects, the present invention relates to a routing process for designing an optimal route for an unprotected private line or wavelength circuit between the source location and the destination location. Upon receipt of a customer request for an unprotected private line or wavelength circuit, the routing process defines customer-specified intermediate nodes through which the circuit must pass between the source and the destination locations, thereby defining one exact path through the network. The routing process then identifies all possible nodes between each pair of intermediate nodes on the given path. Next, the routing process filters the possible capacity links to only those that start, end, or contain intermediate nodes that are allowable nodes on the given path. Based on the service type of the service request and bandwidth required for the circuit, an applied routing policy also filters out unusable capacity links. The routing process then builds a capacity graph including only the filtered set of capacity links. Next, the routing process applies Dijkstra's algorithm to the capacity graph to determine an optimal route of capacity links from end to end that provide the least cost route for installation. After the optimal route is selected, the routing process determines whether the optimal route is available for use by the circuit. If available, the optimal route, including the specific capacity links used to design the route, is submitted to a command and control engine for installation of the optimal route. If, however, the optimal route is not available, the routing process is repeated until such an optimal route is found.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

The great utility of the invention is that an optimal route for a circuit may be designed within a matter of seconds, rather than months. Additionally, the automated process guarantees that each route designed for a particular telecommunications carrier is designed in substantially similar fashion, thereby eliminating design inconsistencies associated with prior manual processes administered by any number of route designers.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
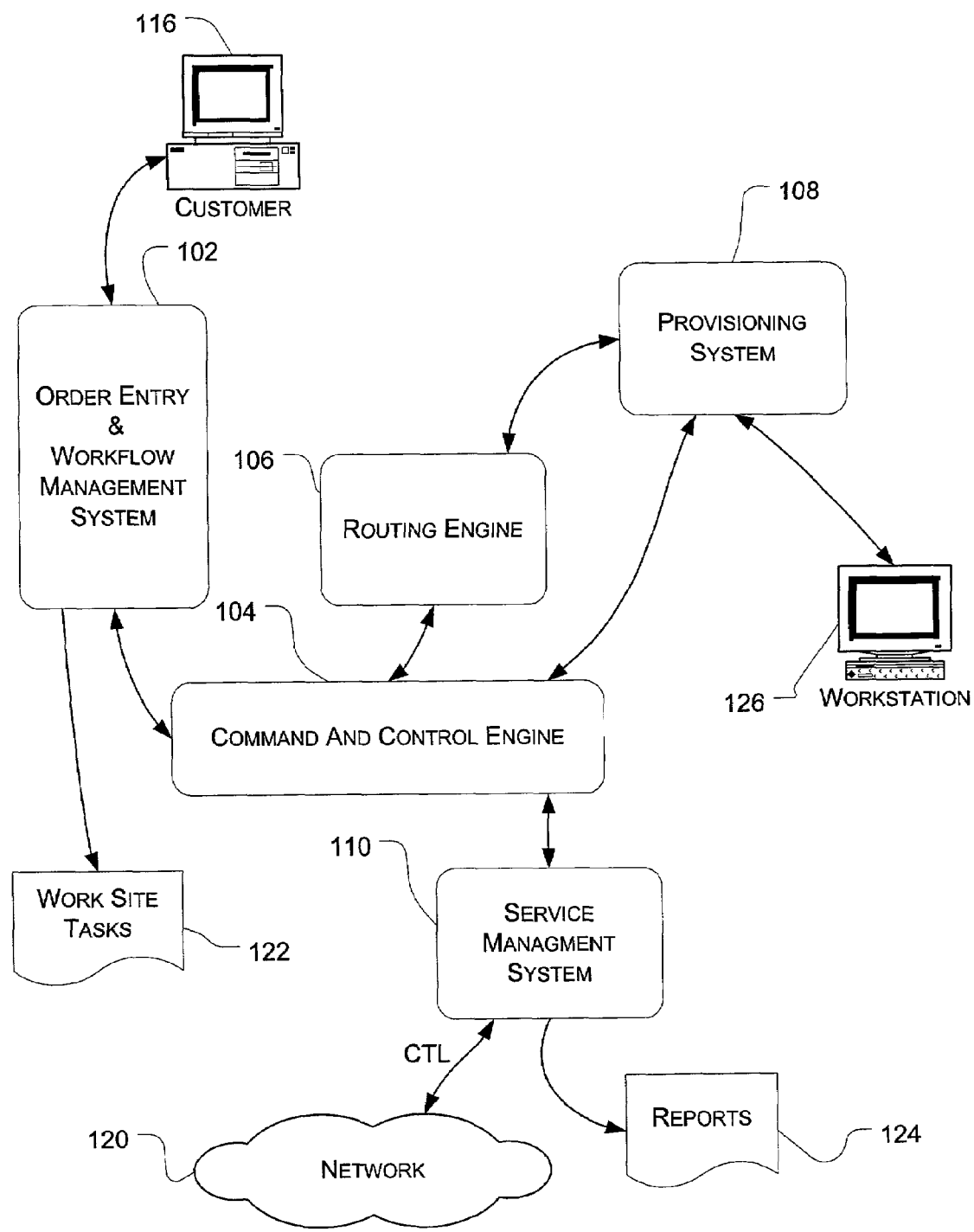
FIG. 1 shows a system for automatically installing communication lines in response to network service requests.

FIG. 1 shows the architecture of an automated installation system for delivering a private line circuit to a customer with minimal delay. The system has an order entry and work flow management system 102, a command and control engine 104, a routing engine 106, a provisioning system 108 and a service management system 110. The command and control engine 104 integrates the operations performed by all of the other engines and systems to control the installation system operations.

The order entry system 102 works with a customer or salesperson through a remote computer 116 to take an order for the customer. Based on information such as capacity and availability, as determined by the routing engine 106, the order entry system 102 will conduct a dialog with the customer or salesperson through a user interface at the remote computer 116. This real time dialog collects information from the customer necessary to design the private line circuit and provides real time feedback to the customer on availability and implementation installation dates.

The routing engine 106 receives input from the command and control engine 104 to determine possible paths for the private line circuit to be provided to the customer. The routing engine 106, under control of the command and control engine 104, returns information to the order entry system 102 regarding the capacity of the system. The order entry system 102 can then reply to the customer or salesperson in a real time basis as to whether the customer order can be accommodated.

After the routing engine 106 has determined a proposed route, it passes this route back to the command and control engine 104. The command and control engine 104 engages the provisioning system 108 to provision and assign elements to the route. The provisioning system 108 validates and returns design information to the command and control engine 104. Once validated, the route is provided to the service management system 110 along with configuration information.

The service management system 110 then automatically configures the network 120 to create the private line circuit from end to end in accordance with the customer order. The service management system 110 works with various element-driving units to drive network elements in the network 120 to connect and activate the private line circuit. Once the private line circuit is connected and activated in the network 120, the command and control engine 104 controls the workflow management system 114 to generate worksite task lists to implement the end point connections to the customer. In most instances, all of the worksite tasks will be just those necessary at the end points to connect into the customers systems, but they could also include a worksite task along the route.

Figure 2:
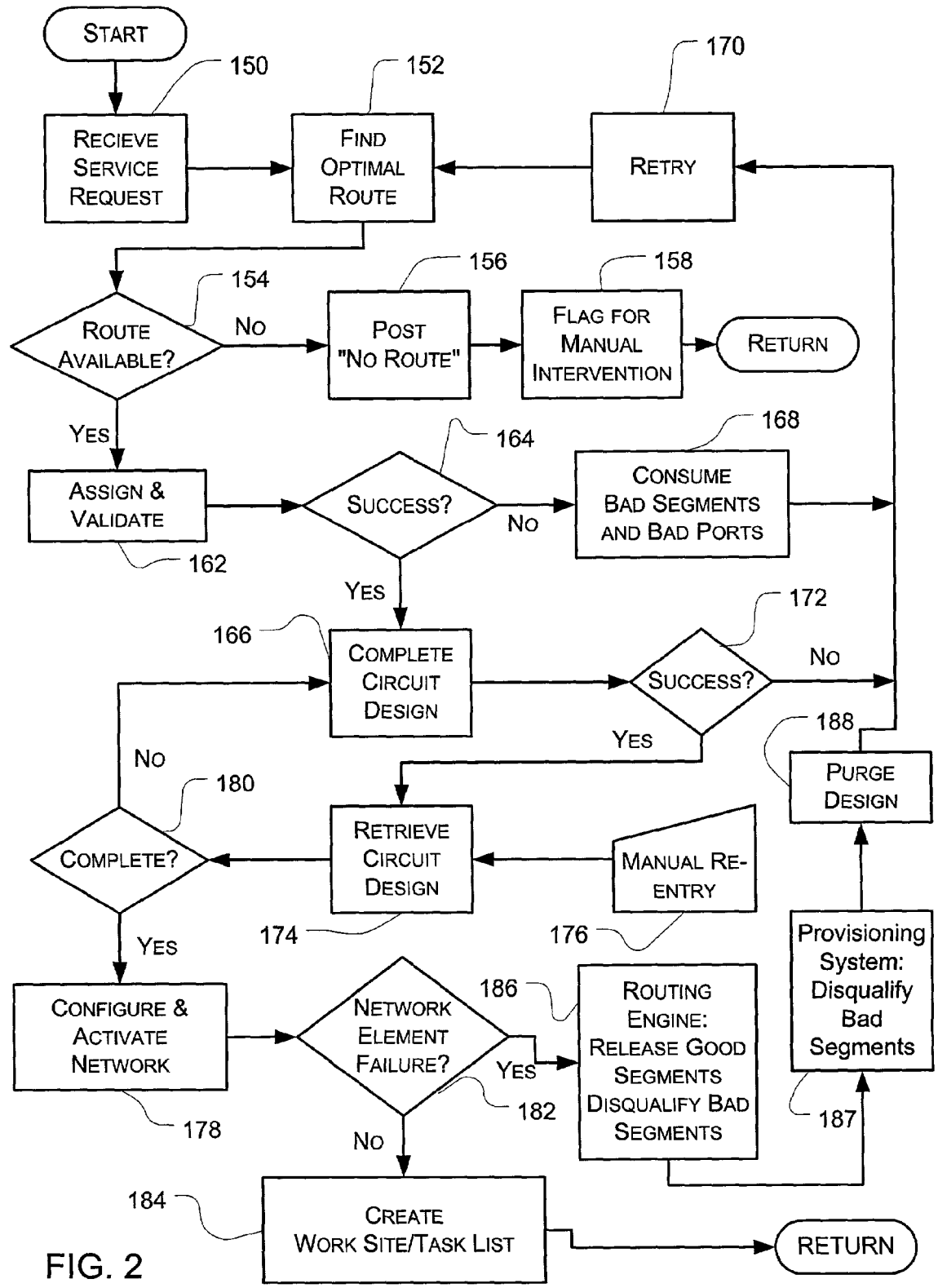
FIG. 2 illustrates one embodiment of the operations performed in installing a communication line with the system of FIG. 1.

FIG. 2 shows an operational flow for the installation of a private line circuit using the automated installation system of FIG. 1. The automated operation flow begins when a service request is received at the receive operation 150. The service request will include a source end point, a destination end point and properties associated with the type of service desired. This service request is passed to a find optimal route module 152. The find optimal route module 152, which is in the routing engine 106 (FIG. 1), will apply the service request to possible capacity links generated from a network inventory database. Capacity links are defined as the network's ability to transport bits of data traveling over pre-defined segments of the network via a Wavelength, Facility, or Ring. The term capacity link is used herein to represent long haul or local/metro capacity links. Whereas a long haul link represents capacity between two nodes or locations on a long distance network, local/metro capacity links represent capacity between two nodes or locations on a local or metro network. An optimal route satisfying the service request is then selected based on Dijkstra's algorithm. Other routing algorithms such as Bell/Ford algorithm, Johnson's algorithm and Floyd-Warshall algorithm could be used. After the find optimal route module 152 selects an optimal route, the operation flow passes to a route available test operation 154.

The route available test operation 154 detects whether the find optimal route module was successful in finding a route to satisfy the request. If the route is not available, then the operation flow branches NO to a post operation 156. The post operation 156 will return a "no route" message in response to the service request. Following the post operation 156, the operation flow passes to a notification operation 158. The notification operation 158 will flag the service request for manual intervention and the automated installation operation flow returns back to the main process flow in the computing system.

If the route is available, then the operation flow branches YES from the route available test operation 154 to an assign and validate operation 162. The command and control engine 104 (FIG. 1) works with the provisioning system 108 (FIG. 1) to perform the assign and validate operation 162. Based on the route identified by the find optimal route module 152, the provisioning system 108 assigns and validates network elements and connection segments in the route. Assigning a segment or network element is accomplished by marking the segment or port of a network element as consumed against the customer service request. If all of the segments and ports of network elements required for the route can be assigned and validated, success detect operation 164 will indicate the route components are assigned and validated and the operation flow will branch YES to complete circuit design module 166. If the assignment fails due to a race condition with capacity consumed by a front end user of the provisioning system 108, then the success detect operation 164 will branch the operation flow NO to consume bad segments and bad ports operation 168. By consuming the bad segments and bad ports, the consume operation 168 effectively marks these components—segments and ports—as unusable in the network inventory database. After the segments and ports are so marked, the operation flow returns to retry operation 170. The retry operation 170 again applies the service request to the find optimal route module 152. The find optimal route module 152 will again operate to find a route, but this time the bad segments and bad ports marked consumed by the consume operation 168 are not available for use in finding a route. Accordingly, if find optimal route module 152 finds another optimal route, the new route will be passed by test operation 154 to the assign and validate operation 162. This operations loop continues until a route whose segments and ports of the network elements can be assigned and validated is found and successfully tested by the detect operation 164.

For routes that have been successfully assigned and validated, a complete circuit design module 166 builds the circuit from end point to end point on paper as a circuit layout record (CLR). The complete circuit design module 166 builds the circuit such that the circuit identifies all network elements, all ports, all segments and all properties associated with each component or device in the circuit. Once the circuit design is completed, design success test operation 172 tests whether the circuit design was completed and validated. Since the completed circuit module 166 has effectively approved all of the components of the circuit, any circuit design preceding down the path through complete circuit module 166 will be passed by the circuit design success test to retrieve circuit design operation 174. Design success test 172 as will be discussed shortly is provided for the situation where manual design intervention has occurred.

Manual re-entry input 176 indicates manual intervention, if necessary, has been completed. The retrieve circuit design operation 174 retrieves the circuit design and passes that circuit design to the configure and activate network operation 178. The "complete" test operation 180 is provided because a circuit design where there is manual intervention may not be complete. In this situation the operation flow would branch NO back to complete circuit design 166. If the complete circuit design operation 166 can not complete the design, then the design success test operation 172 would detect the failure and branch NO back to retry operation 170. Retry operation 170 would then cause the find optimal route operation 152 to find another optimal route for the service request. Accordingly, the manual re-entry input operation 176, the complete test operation 180 and the design success test operation 172 are provided only because of the desire to be able to accommodate manual intervention in a design. If the system were only going to deal with automated designs, then the operation flow would be directly from complete circuit design operation 166 to retrieve circuit design operation 174 and to configure and activate network operation 178.

In the configure and activate network operation 178, the service management system 110 (FIG. 1) works under control of the command and control engine 104 (FIG. 1) to communicate the configuration information to all of the network elements making up the circuit design for the line being installed. The configure and activate operation 178 fault tests the circuit design against the live network inventory. If no faults are found, the configure and activate operation 178 configures all of the network elements in the network to create the segments and port connections making up the private line circuit. Once the network elements are configured so that the circuit exists for the private line, the circuit is activated and tested. Network element failure test operation 182 passes the operational flow to create operation 184 if there is no network element failure. On the other hand, if there is an error in the design or a network element failure, the operation flow passes to release operation 186. Release operation 186 releases all of the good segments and disqualifies all the bad segments for the route in the routing engine. Disqualify operation 187 disqualifies in the provisioning system 108 all the bad segments from the route. Finally, purge operation 188 purges the entire design from the provisioning system 108. After the purge design operation 188, the operational flow returns to retry operation 170. Retry operation 170 signals the find optimal route module 152 to again begin looking for a route to provide a private line for the service request.

The create operation 184, when the network activation is successful, is the last operation performed by the installation system. In the create operation 184, a work site task list is generated for all tasks that must be accomplished manually. Typically this will be just the final hookup or connection between the customer and the end point of the network provided by the network provider. However, there could be limited instances where for some reason the automated configuration and activation of the network did not fail but flagged the need for a manual intervention at a work site along the route. This could occur where a node has not been completely automated for control from the service management system 110 (FIG. 1). After the network has been activated to provide the line, and the task list has been generated, the operation flow exits from the installation routine and returns to the main computer system operation flow.

Figure 3:
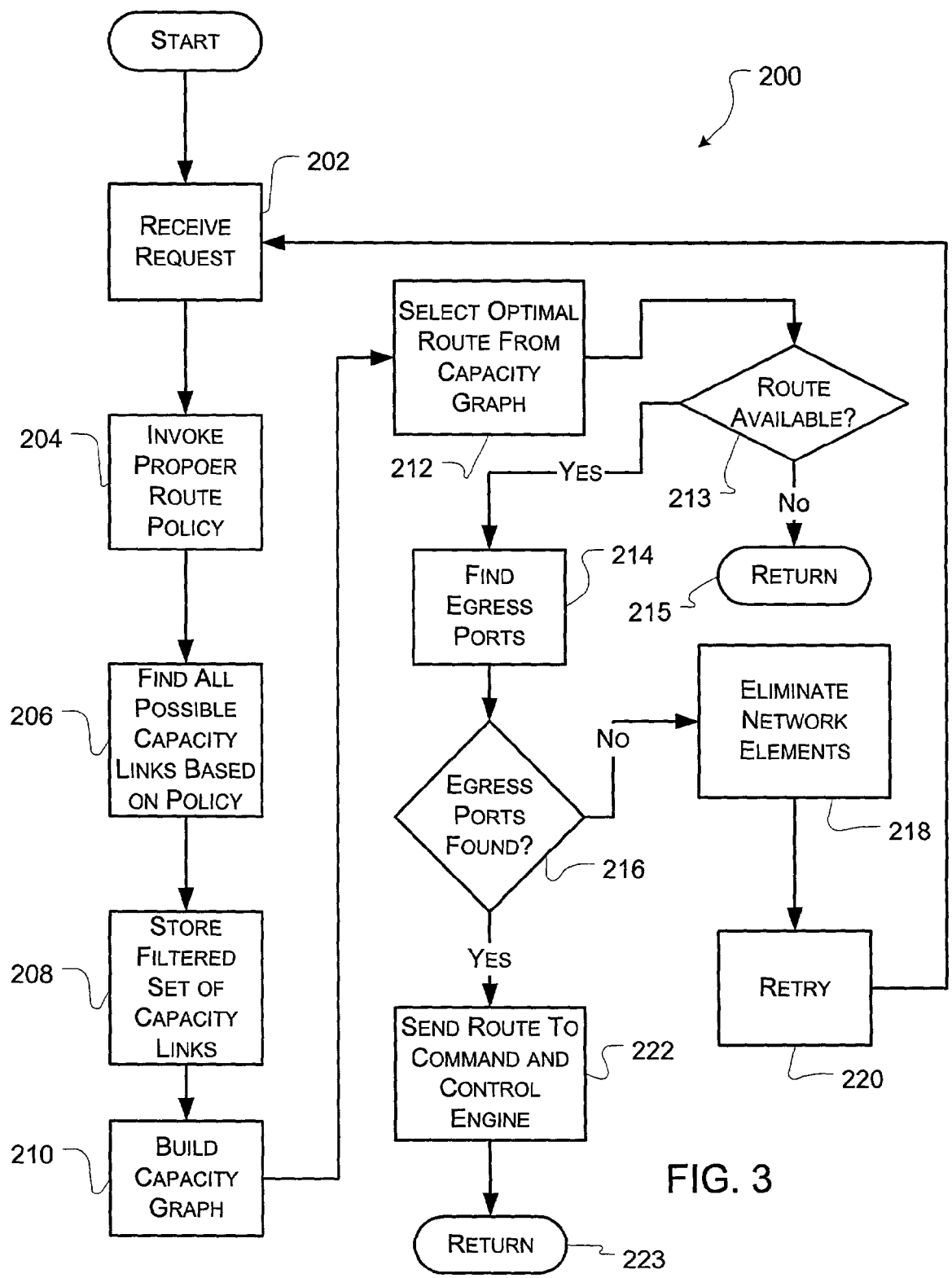
FIG. 3 shows the operational flow of one embodiment of the find optimal route module 152 of FIG. 2 performed by the routing engine 106 of FIG. 1.

One preferred embodiment of the operations performed by the routing engine 106 is illustrated in FIG. 3. FIG. 3 depicts operations of a routing engine 106 that routes on pure capacity only and does not take egress ports into consideration when making least cost route choices. The routing engine 106 in this embodiment assumes that capacity links in the backbone can be cross connected at a common location. After a least cost route is found, the routing engine 106 searches for egress ports for a cross connect between network elements or for the cross connect to the customer. A cross connects is a link from an egress port through a location node to another egress port or to a customer demarcation. The routing engine 106 can report where capacity was available but no egress ports were available to connect the capacity. Such a routing process 200 of the routing engine 106 of this embodiment comprises an operation flow beginning with a receive operation 202.

The receive operation 202 receives a service request for a private line circuit between a source location and a destination location. The service request includes the source location, the target or destination location and the bandwidth of the service requested. After a service request for a private line circuit is received by the receive operation 202, the operation flow passes to an invoke operation 204. The invoke operation 204 retrieves the proper route policy for the service request and invokes the routing rules of the route policy. The routing rules, which are hereinafter described for different service types, are dependent on the type of service request and the performance required for the service. From the invoke operation 204, the operation flow passes to a find operation 206.

The find operation 206 uses the routing rules to find all possible capacity links through the network that satisfy the routing rules for a given service type and bandwidth. In this manner, the find operation 206 filters the possible capacity links to a set of capacity links of the given service type and bandwidth. From the find operation 206, the operation flow passes to a store operation 208. The store operation 208 stores the filtered set of capacity links in memory or working storage and the operation flow passes to a build operation 210.

The build operation 210 retrieves the filtered set of capacity links from storage and attaches a weight or cost to each capacity link to build a capacity graph of the capacity links for analysis in selecting an optimal route. The weight of each capacity link may represent any number of parameters that distinguish each capacity link based on cost factors. For example, the weight provided on the graph may represent the distance between nodes creating each link or a cross-connect, physical or logical, required to connect adjacent capacity links. The capacity graph might be a table of data but can be visualized as an undirected, weighted graph of capacity links, such as the exemplary capacity graph depicted in FIG. 4. After the capacity graph is built, the operation flow passes to a select operation 212.

The select operation 212 analyzes the capacity graph to select an optimal route between the source and destination locations for the private line circuit specified by the service request. In accordance with the embodiment described with reference to FIG. 3, the route information in the capacity graph contains link or connection segment information of capacity between two network elements in the same location or spanning two locations. Within a given location node the physical connections that need to be made between network elements in that node are not analyzed by the select operation 212, rather any physical connections between network elements are assumed to be possible and are represented on the graph as an assumption which will be solved later during the find egress port operation 214. The select operation 212 applies Dijkstra's algorithm to the capacity graph to select the group of capacity links having the least cost factor as the optimal route for service between a source node corresponding to the source location and a destination node corresponding to the destination location. The cost factor is thus one means of determining the least cost route and may be a function of various parameters, for example, without limitation, the distance of the capacity links and the number of cross-connects, physical or logical, required between the source and destination location endpoints. Following the select operation 212, the operation flow passes to the route available test operation 213.

The route available test operation 213 determines whether an optimal route was selected by the select operation 212 as available to be used for routing the service request between the destination location node and the source location node. If an optimal route is not selected as available, the operation flow branches NO from the route available test operation 213 to the post "no route" operation 156 of FIG. 2. In contrast, the route available test operation 213 branches the operation flow YES to a find egress ports operation 214 if the select operation 212 indeed identifies an optimal route as available.

More specifically, the network elements where a physical connection needs to be made are passed to the find egress ports operation 214. The find egress ports operation 214 reviews the egress ports available at the network element. If the appropriate egress ports in network elements at a given location do not exist, there can be no connection made between network elements or to the customer at the source or destination locations. Instances where there may be no egress ports available include: (1) the appropriate egress port is already in use in another route, (2) the slot on the network element is empty, i.e., a card/port has not been installed to support the given bandwidth and service, or (3) the parameters of the egress ports on the network element do not match required parameters, i.e., the ports exist, but do not support the required bandwidth. If the proper egress port is not available at both network elements where a cross connect needs to be made, the network elements cannot be cross-connected, and the route fails. Further, if no egress ports are available at the source or destination location, no cross connect can be made to the customer. Once the find egress ports operation 214 has found the egress ports at a location, the operation flow passes to an egress ports test operation 216. The egress ports test operation 216 detects whether the necessary egress ports are available at the network elements. If the necessary egress ports are not available, the operation flow branches NO to an eliminate operation 218. The eliminate operation 218 eliminates all the network elements without egress ports used in the optimal route just selected. However, there can be, and often are, more network elements available at the locations. The eliminate operation 218 only eliminates, or marks unavailable for use in a route, the network elements that are detected as not having the correct egress port.

After the network elements are marked as eliminated, the retry operation 220 returns the operational flow to the receive operation 202 to initiate another loop through the operational flow of the routing process 200 to find a new optimal route. The continued cycling through the loop to find an optimal route proceeds until a route is found where all of the egress ports along the route exist or until some limited number of retries have occurred. Each re-route may duplicate much of the previous route, but use a different capacity link where no egress ports were found on a particular network element. Network elements where no egress ports were found are placed in an exclusion list and are excluded from capacity links when a graph is re-built for each re-route performed. The re-route is performed in a continuous loop until an optimal route is found. When an optimal route has been found, and it has all of the appropriate egress ports, the operational flow branches YES from the egress ports test operation 216 to a send operation 222. The send operation 222 sends the optimal route to the command and control engine 104. The operational flow then returns to the operation flow in FIG. 2 at the assign and validate operation 162.

Figure 4:
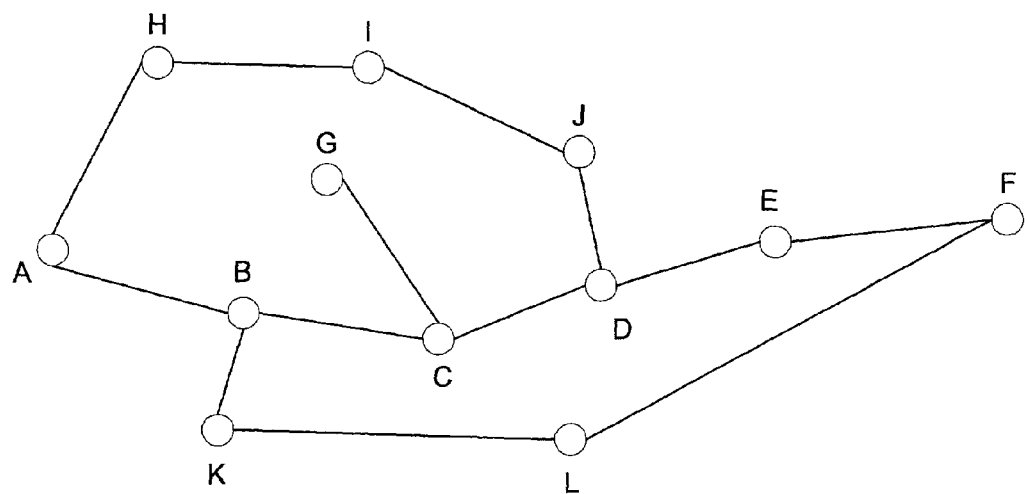
FIG. 4 is an example of a graph of capacity links that may be selected to satisfy a network service request.

FIG. 4 illustrates an example of a graph of routes with long haul links between location nodes in the network as built by the build operation 210 of the routing process 200 shown in FIG. 3. As an illustration, the network service request illustrated in FIG. 4 specifies a source location A and a destination location F. Further, it is assumed that the capacity links and location nodes depicted in FIG. 4 satisfy the bandwidth and other service parameters. The possible routes that satisfy the filter based on the network service request are thus route A, B, C, D, E, F; route A, H, I, J, D, E, F; route A, H, I, J, D, C, B, K, L, F; and route A, B, K, L, F. Since the distance between nodes in many algorithms is a heavily weighted factor in avoiding delay in a route as well as cost to install the route, it is likely that the optimal route has the shortest distances. Accordingly, the optimal route in this example is A, B, K, L, and F.

As noted above, in the event that find egress ports operation 214 cannot find the appropriate egress ports at network elements A and F, an exclusion list is built for the network elements in question at network elements A and F with no egress capacity. A re-route is then performed and a new graph is built without the capacity links that terminated in the excluded network elements at A and F. If there are more network elements at A and F that are available, the next route would most likely be A, B, K, L and F if all weights are equal on this capacity link. This process would continue until appropriate network elements with the necessary egress ports were found. Of course if all of the network elements along the A, B, K, L, F route ultimately are eliminated, then the shortest route, which is likely the A, B, C, D, E, F route, would be tried.

Figure 5:
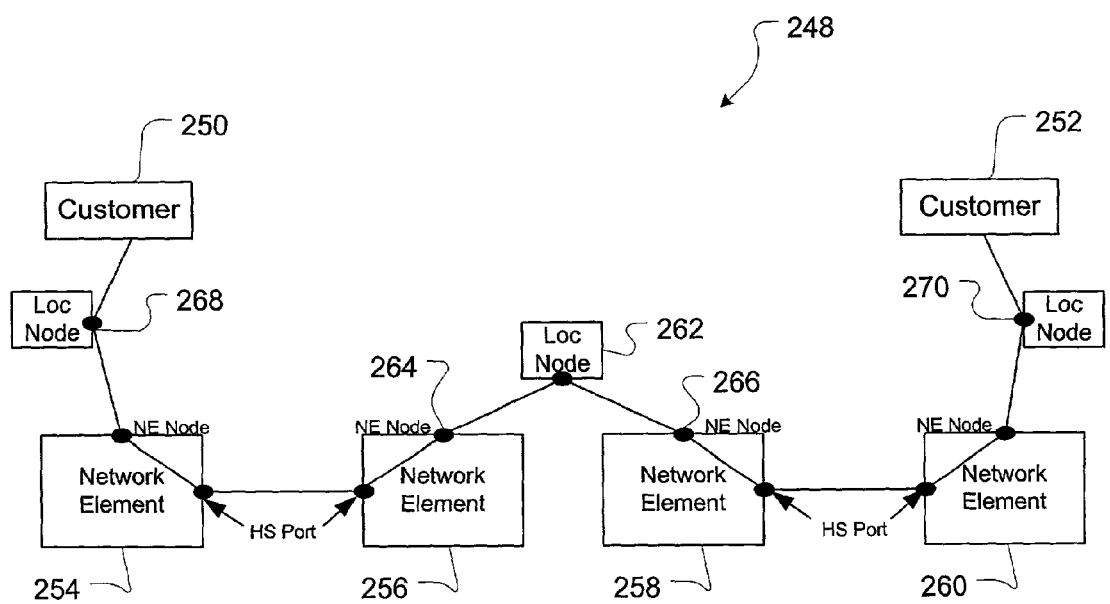
FIG. 5 is a network graph illustrating a least cost route selected using the operational flow of FIG. 3.

FIG. 5 is an example of a network graph 248 of a private line circuit between a customer demarcation 250, i.e., endpoint or hookup, at a source location specified in the service request and a customer demarcation 252, i.e., endpoint or hookup, at a destination location specified in the service request, wherein the private line is constructed using the routing process 200 of the embodiment shown in FIG. 3. Specifically, the network graph 248 represents an optimal route found using the select operation 212. The network graph 248 comprises a first network element 254, a second network element 256, a third network element 258 and a fourth network element 260. The first network element 254 is located at the source location, where the customer demarcation 250 is also located. Similarly, the fourth network element 260 is located at the destination location, where the customer demarcation 252 is located. The location nodes 268 and 270 are defined as points on the network graph 248 where all network elements and customer demarcations that reside in a common physical location can be represented on the network graph 248. This on shown on the network graph 248 using the location nodes 268 and 270 to connect the customer demarcation 250 at the source location to the first network element 254 and the customer demarcation 252 at the destination location to the fourth network element 260, respectively. More specifically, the first network element 254 and the fourth network element 260 are connected to the customer demarcation 250 and the customer demarcation 252, respectively, at the locations nodes (268 and 270) using a cross connect. In accordance with the embodiment of the routing process 200 of FIG. 3, a cross connect may be generally defined as a link from a network element node through a location node to another network element node or to a customer demarcation.

Because the first network element 254 and the second network element 256 are contained within the same communication ring, the elements (254 and 256) are connected via high-speed ports. Likewise, the third network element 258 and the fourth network element 260 are connected via high-speed ports. In contrast, the second network element 256 and the third network element 258 are contained in separate communication rings, but located at a common location. Thus, the second network element 256 and the third network element 258 are connected at a location node 262 with a cross connect. More specifically, the cross-connect is placed in series between the network node 266 for the third network element 258 and the network node 264 for the second network element 256. The graph 248 represents this cross connect by building the network elements cross connect through a common link to the location node 262.

The network elements shown in FIG. 5 do not contain egress ports in the network graph 248. Indeed, this calculation has not been made when building the network graph 248. Thus, in accordance with the routing process 200 shown in FIG. 3, it is assumed that egress ports are available at the first (254) and fourth (260) network elements to connect to the customer demarcation 250 at the source location node 268 and the customer demarcation 252 at the destination location node 270, respectively. Likewise, it is assumed that egress ports are available at the second network element 256 and the third network element 258 for connection of the cross connect 262. Such assumptions will be verified during the egress ports test operation 216, as described above.

Figure 6:
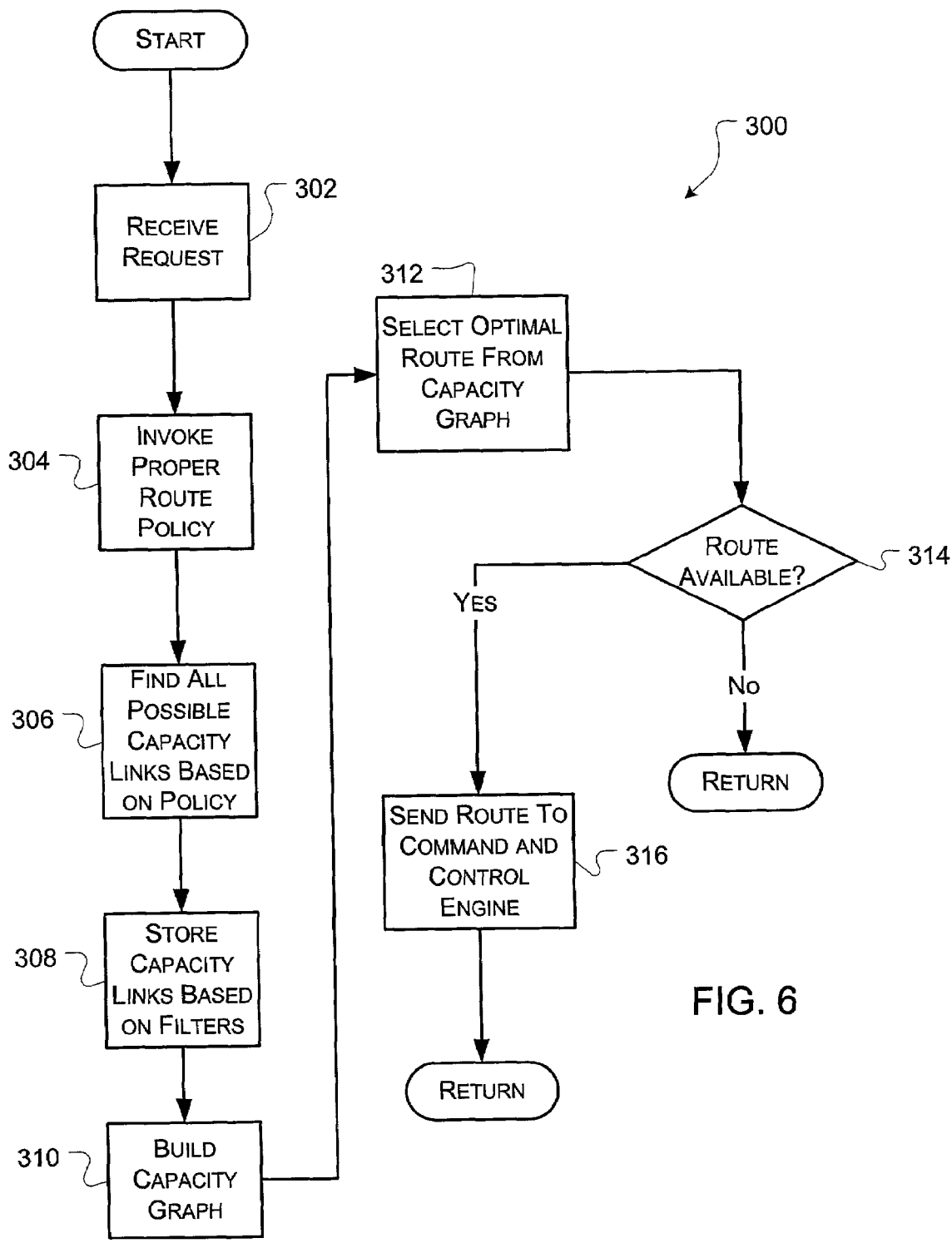
FIG. 6 shows the operational flow of another embodiment of the find optimal route module 152 of FIG. 2 performed by the routing engine 106 of FIG. 1.
Figure 7:
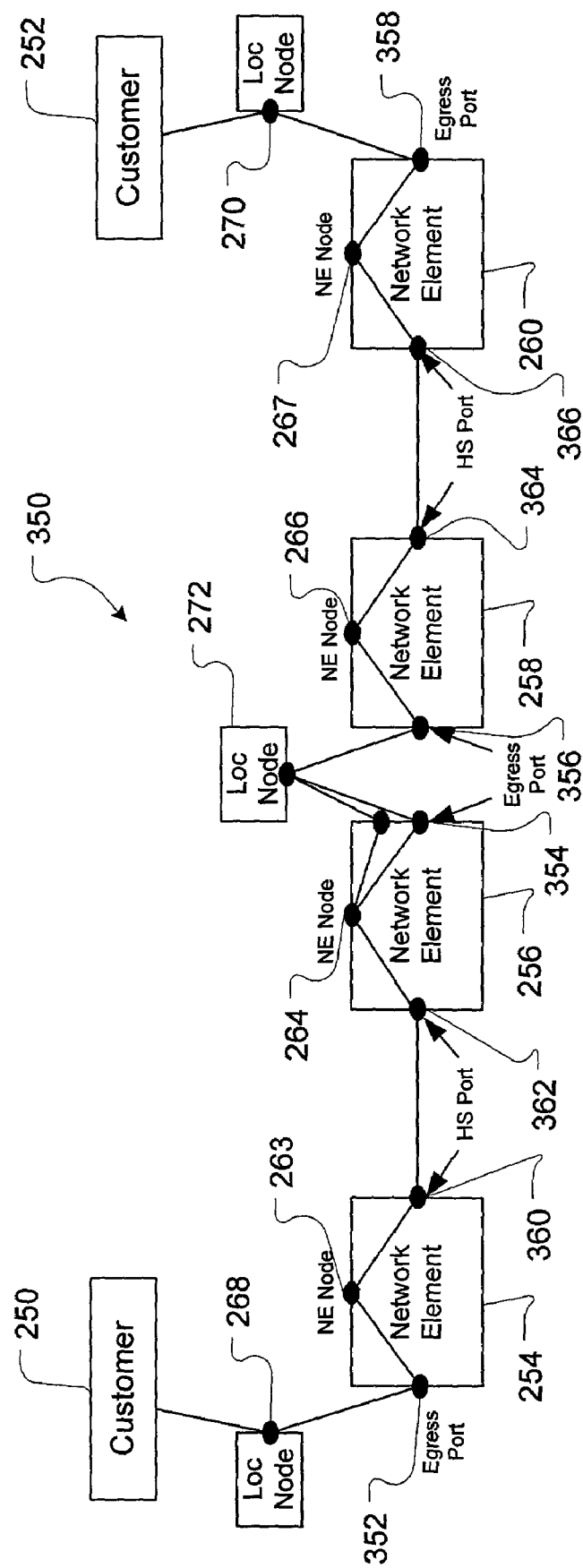
FIG. 7 is a network graph illustrating a least cost route selected using the operational flow of FIG. 6.

Another preferred embodiment of the operations performed by the routing engine 106 is illustrated in FIG. 6. FIG. 6 depicts operations of a routing engine 106 that places all egress ports and valid cross connects in the network on a network graph, such as the network graph 350 (FIG. 7). As such, there are no assumptions made by the routing engine 106 of this embodiment that a cross connect can be made between network elements. Rather, this information is represented directly on the graph 350. The routing engine 106 will thus not need to find egress ports at the end of the capacity routing and will never need to retry at the end due to a failure to find egress ports. The routing process 300 of the routing engine 106 of this embodiment comprises an operation flow beginning with receipt of a network service request by a receive operation 302. The service request, as noted above, contains the source location, the destination location, the bandwidth, the service type and other parameters related to the service request. After the service request is received, the operation flow passes to an invoke operation 304. The invoke operation 304 retrieves and invokes the proper route policy to accommodate the service request. From the invoke operation 304, the operation flow passes to a find operation 306.

The find operation 306 retrieves data from an asset inventory of network records. In addition to the capacity links and network elements at location nodes, the retrieved network data includes the details of egress ports on each network element. The find operation 306 identifies all possible capacity links through the network that satisfy and are based upon the rules of the route policy retrieved by the invoke operation 304. The identified capacity includes the egress ports, connections and cross connects at intermediate nodes between the source and destination locations. Accordingly, more information is available to the operational flow in FIG. 6 than is available to the operational flow in FIG. 3. In other words, the capacity identified using the operational flow in FIG. 6 includes the connections between a customer demarcation, i.e., endpoint or hookup, to a network element at the source location node and a customer demarcation, i.e., endpoint or hookup, to a network element at the destination location node. With all possible capacity links identified, the operation flow passes to a store operation 308. The store operation 308 places all valid capacity links, cross connects and egress ports into memory. From the store operation 308, the operation flow passes to a build operation 310.

The build operation 310 retrieves the subset of capacity links satisfying the service request and builds a capacity graph of undirected capacity links between the customer demarcation at the source location node and the customer demarcation at the destination location node. The capacity graph contains each of the capacity links of the subset, including intermediate, source and destination location nodes. The capacity graph might be a table of data but can be visualized as an undirected, weighted graph of capacity links, such as the exemplary capacity graph depicted in FIG. 4. After the capacity graph is completed, the operation flow passes to a select operation 312.

The select operation 312 analyzes the capacity graph to find the optimal route through the network. As described with reference to FIG. 3, such an analysis is performed using Dijkstra's algorithm. Indeed, the select operation 312 of the operation flow for FIG. 6 only differs from the select operation 212 of the operation flow for FIG. 3 in that the select operation 312 has available all necessary information represented on the graph, including egress port information and cross connect information inside a given location along the route, to select the optimal route for the service request. The select operation 212 in FIG. 3 did not have egress port information available on the capacity graph and when the capacity graph was built, rather cross connects were placed on the graph between network elements at a common location node as an assumption that they were possible, and this analysis was not completed until the find egress port operation 214. Accordingly, after the select operation 312 selects an optimal route for the service request, there is no further question about whether egress ports are available because this consideration has been taken care of by the find operation 306.

FIG. 7 provides an illustration of the differences between a network graph 350 of an optimal route rendered by the routing process 300 of the embodiment described with FIG. 6 and the routing process 200 of the embodiment described with FIG. 3. Contrasting FIGS. 7 and 5 will show the differences between representing egress ports (352, 354, 356 and 358) on a network graph and the assumption that these egress ports (352, 354, 356 and 358) will be available, respectively. As such, FIG. 7 shows a network graph 350 substantially similar to the network graph 248 of FIG. 5, with several distinctive features. First, egress ports (352, 354, 356 and 358) are calculated by the routing process 300 as available and actually included within selection of an optimal route, as shown by the egress ports (352, 354, 356 and 358) in the network graph 350. Thus, it is known upon selection of an optimal route whether an egress port 352 is indeed available at each of the network elements (254, 256, 258 and 260). Indeed, if an egress port (352, 354, 356 or 358) were unavailable on the network graph 350 in FIG. 7, no link between the network element node (263, 264, 266 or 267) and the egress port (352, 354, 356 or 358) and no link to the location node (268, 270 or 272) from the egress port (352, 354, 356 or 358) would exist. As Dijkstra's algorithm walked the network graph 350 and no egress port (352, 354, 356 or 358) existed, the algorithm would hit a dead end at the network element node (263, 264, 266 or 267) of the network element (254, 256, 258 or 260) and start walking the graph in another direction since no links existed. Furthermore, cross connects at locations nodes (268, 270 and 272) link each egress port (352, 354, 356 or 358) through a location node (268, 270 or 272) to another egress port (352, 354, 356 or 358) or to a customer demarcation (250 or 252), as shown at the locations nodes (268, 270 and 272). Indeed, each network element (254, 256, 258 and 260) comprises an egress port (352, 354, 356 or 358) and a high-speed port (360, 362, 364 or 366), rather than only a high-speed port as shown in the network graph 248 (FIG. 5) of the optimal route selected using the routing process 200 of FIG. 3. The egress ports (352, 354, 356 and 358) are joined to the high-speed ports (360, 362, 364 or 366) by the network element (NE) nodes (263, 264, 266 or 267) of the network elements (254, 256, 258 or 260).

Following the select operation 312, the operation flow passes to the route available test operation 314. The route available test operation 314 determines whether an optimal route was selected by the select operation 312 as available to be used for routing the service request. The route available test operation 314 passes the operation flow to a send operation 316 if an optimal route is found by the select operation 312. The send operation 316 transmits the optimal route information to the command and control engine 104 and the operation flow returns to the assign and validate operation 162 of FIG. 2. On the other hand, if an optimal route is not selected as available, then the operation flow branches NO from the route available test operation 314 to the post "no route" operation 156 of FIG. 2.

Figure 8:
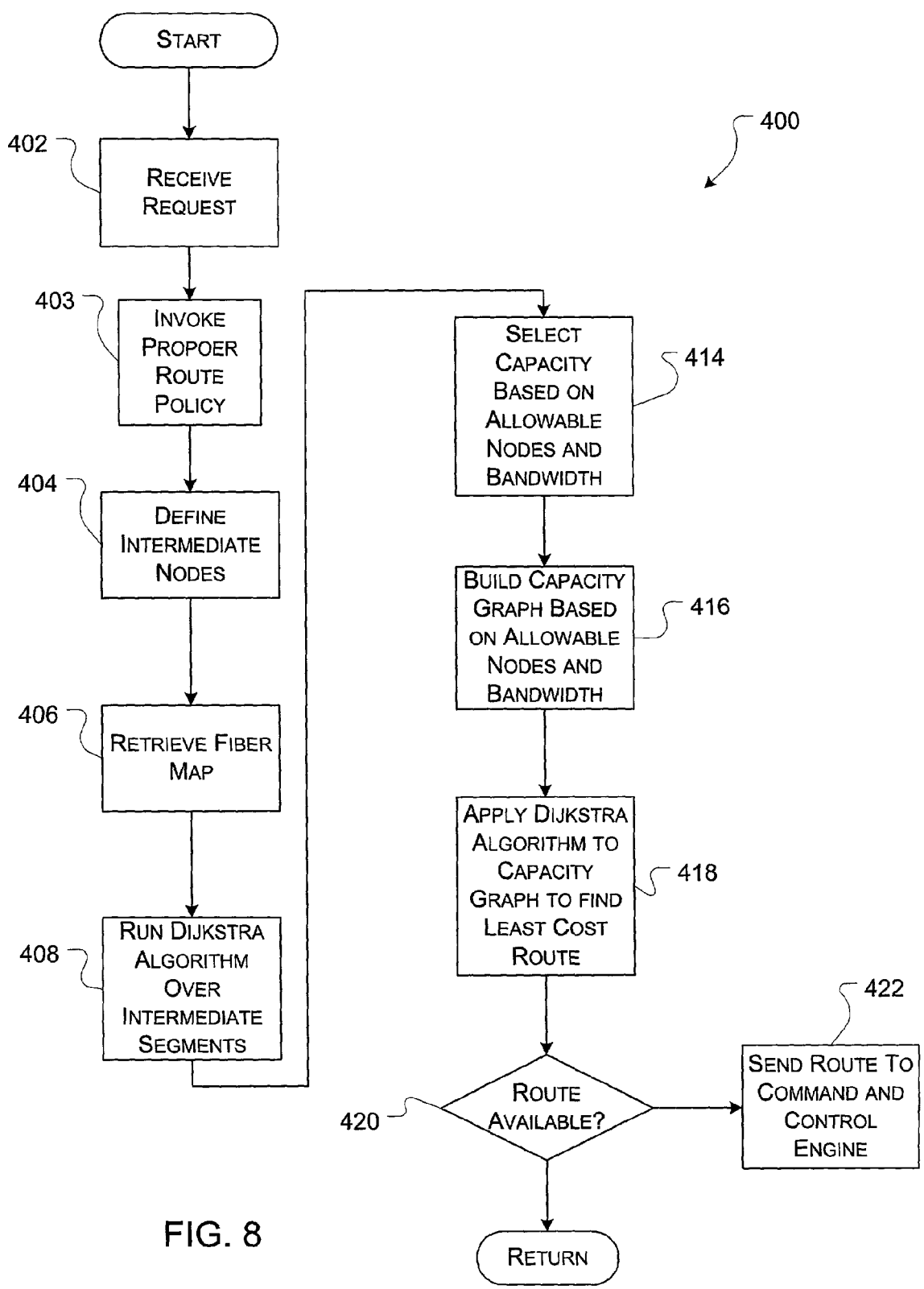
FIG. 8 shows the operational flow of another embodiment of the find optimal route module 152 of FIG. 2 performed by the routing engine 106 of FIG. 1.

Referring now to FIG. 8, shown therein is a routing process 400 for rendering an optimal route for a service request for installation of an unprotected private line or wavelength circuit between a source end point and a destination end point in accordance with yet another embodiment of the present invention. The routing process 400 is thus a specific embodiment of operations performed by the find optimal route module 150 of the routing engine 106. The routing process 400 comprises an operation flow beginning with a receive operation 402 and terminating with either a return operation 424 or a send operation 422. The routing process 400 is initiated upon receipt of a network service request by the find optimal route module 150. As noted above, the service request may include the source endpoint, the target or destination endpoint and the bandwidth of the service requested. Furthermore, in accordance with this specific embodiment, the service request also specifies intermediate nodes between a source node corresponding to the source endpoint and a destination node corresponding to the destination endpoint through which the service request specifies the unprotected private line or wavelength circuit to pass. As an example, if the source location is Denver, Colo. and the destination location is Chicago, Ill., the source node is located in Denver and the destination node is located in Chicago. Exemplary intermediate nodes for this source-destination pair specified by the service request may include Omaha, Nebr., Kansas City, Mo. and St. Louis, Mo. Although there are other ways to get from the source to the destination location, the customer specifies through the service request the exact route of the circuit through the network. The service request may also include additional parameters relating to the service required. Such parameters include bandwidth and service type. After a service request for a route is received by the receive operation 402, the operation flow passes to a define operation 404. The define operation 404 defines the intermediate nodes specified in the service request such that all possible capacity links between the source node and the destination node include the specified intermediate nodes. From the define operation 404, the operation flow passes to a retrieve operation 406.

The retrieve operation 406 retrieves a fiber map of the entire network serviced by the automated installation system through which the unprotected private line or wavelength circuit is being installed. For example, the fiber map may include all possible nodes in the continental United States. The retrieve operation 406 retrieves the entire fiber map, regardless of whether all possible capacity links between the source and destination end point are contained in a specific, contained area of the fiber map. Following the retrieve operation 406, the operation flow passes to an apply operation 408. The apply operation 408 applies Dijkstra's algorithm to the fiber map between the defined intermediate nodes to render a list of sub-intermediate location nodes defining all allowable nodes for the circuit to traverse. That is, the sub-intermediate location nodes serve as network elements through which the route is allowed to pass. As such, a grouping of sub-intermediate nodes defines the set capacity links between the source and destination nodes that are to be used in building a capacity graph. After the possible capacity links linking sub-intermediate nodes between the intermediate nodes are determined by the apply operation 408, the operation flow passes to a filter capacity link operation 414.

The filter capacity link operation 414 filters out any capacity that does not pass through only the allowable node list from the previous operation. Service type and bandwidth are other parameters used to determine usable capacity. From the filter capacity link operation 414, the operation flow passes to a build operation 416. The build operation 416 builds a capacity graph containing only capacity links over the route defined by the customer that have been further limited to the set of allowable sub-intermediate nodes and the filtered set of capacity links as well as cross connects required to install the service. Once the capacity graph is constructed, the operation flow passes to a find optimal route operation 418. The find optimal route operation 418 analyzes the capacity graph to find the optimal route through the network. With respect to this embodiment, the optimal route must pass through the defined intermediate and sub-intermediate nodes only, with the analysis of the find optimal route operation 418 therefore focusing on which set of capacity links yields the least cost factor. Some capacity links may be pre-built and large and may pass through many sub-intermediate nodes where others may be small. The larger pre-built capacity links would require less cross connects to install the service and would be preferred since cross connects are assigned a cost. As described with reference to FIG. 3, FIG. 4 and FIG. 6, such an analysis is performed using Dijkstra's algorithm.

After the find optimal route operation 418 selects an optimal route for the unprotected private line or wavelength circuit specified by the service request, the operation flow passes to the route available test operation 420. The route available test operation 420 determines whether an optimal route was selected by the find optimal route operation 418 as available to be used for routing the service request. The route available test operation 420 passes the operation flow to a send operation 422 if an optimal route was found. The send operation 422 transmits the optimal route information to the command and control engine 104 and the operation flow returns to the assign and validate operation 162 of FIG. 2. On the other hand, if an optimal route is not selected as available, then the operation flow branches NO from the route available test operation 420 to the post "no route" operation 156 of FIG. 2.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An automated routing system for designing a route in a communications network through which a communication line may be installed between a source location and a destination location as specified in a service request for the communication line, the system comprising:
   a find module identifying one or more possible capacity links within the communication network, each capacity link representing an ability to transport data over a predefined segment of the communication network between the source location and the destination location;
   a build module constructing a capacity graph of the communication network depicting connectivity of each of the possible capacity links to an adjacent possible capacity link such that one or more possible routes are defined between a source node representing the source location and a destination node representing the destination location; and
   a select module applying a routing algorithm to the capacity graph to select an optimal route from the one or more possible routes based on a calculated cost factor for installation of the communication line into each of the possible routes within the computer network.

2. The system of claim 1, further comprising:
   an invoke module retrieving a route policy for the communication line specifying routing rules based on a given service type of the service request and bandwidth require for installation of the communication line and invoking the route policy such that the find module identifies only possible capacity links that satisfy the routing rules.

3. The method of claim 1, further comprising:
   a route available test module testing whether the optimal route is available for use by the communication line.

4. The system of claim 3, further comprising:
   a submit module submitting the optimal route to a command and control engine for installation of the communication line using the optimal route if the route available test module determines that the optimal route is available for use by the communication line.

5. The system of claim 3, wherein the select module re-applies the routing algorithm to the capacity graph to select a subsequent optimal route if the route available test module determines that the optimal route is not available for use by the communication line.

6. The system of claim 5, wherein the optimal route found not available for use by the communication line is eliminated as the one or more possible routes defined by the capacity graph.

7. The system of claim 1, wherein the calculated cost factor for each of the possible routes is determined based on a total distance of the predefined segments covered by the capacity links defining each possible route.

8. The system of claim 1, wherein the service request specifies intermediate locations through which the communication line must pass between the source location and the destination location, the system further comprising:

a define module defining an intermediate node corresponding to each intermediate location such that the find module identifies only possible capacity links that may be joined between adjacent intermediate nodes, a first intermediate node and the source node and a final intermediate node and the destination node.

9. The system of claim 1, wherein the routing algorithm is Dijkstra's algorithm.

10. The system of claim 1, wherein the communication line is a private line.

11. The system of claim 1, wherein the communication line is an unprotected private line circuit.

12. The system of claim 1, wherein the communication line is a wavelength circuit.

13. An method for designing a route in a communication network through which a communication line may be installed between a source location and a destination location as specified in a service request for the communication line, the method comprising:
identifying one ore more possible capacity links within the communication network, wherein each capacity link represents an ability to transport data over a predefined segment of the communication network between the source location and the destination location;
building a capacity graph of the communication network depicting connectivity of each of the possible capacity links to an adjacent possible capacity link such that one or more possible routes are defined between a source node representing the source location and a destination node representing the destination location;
calculating a cost factor for each possible capacity link within the communication network; and
selecting an optimal route from the possible routes based on the calculated cost factor for each possible link.

14. The method of claim 13, wherein the calculating act comprise: applying a routing algorithm to the capacity graph.

15. The method of claim 14, wherein the routing algorithm is Dijkstra's algorithm.

16. The method of claim 13, wherein the identifying step comprises:
retrieving a route policy for the communication line specifying routing rules based on a given service type of the service request and bandwidth required for installation of the communication line; and
invoking the route policy to identify only possible capacity links that satisfy the routing rules.

17. The method of claim 13, wherein the selecting act comprises:
selecting a source network element for connecting the source node to a first customer demarcation located at the source location; and
selecting a destination network element for connecting the destination node to a second customer demarcation located at the destination location.

18. The method of claim 17, further comprising:
testing whether the source network element contains an incoming egress port for connecting to the first customer demarcation; and
testing whether the destination network element contains an outgoing egress port for connecting to the second customer demarcation.

19. The method of claim 18, further comprising:
if the source network element does not contain an incoming egress port, repeating the selecting act to select a subsequent source network element; and if the destination network element does not contain an outgoing egress port, repeating the selecting act to select a subsequent destination network element.

20. The method of claim 13, further comprising:
testing whether the optimal route is available for use by the communication line.

21. The method of claim 20, further comprising:
submitting the optimal route to a command and control engine for installation of the communication line using the optimal route if the optimal route is available for use by the communication line.

22. The method of claim 20, wherein the selecting act comprises:
selecting a subsequent optimal route if the optimal route is not available for use by the communication line.

23. The method of claim 22, wherein the optimal route found not available for use by the communication line is eliminated as the one or more possible routes defined by the capacity graph.

24. The method of claim 13, wherein the calculating act comprises:
rendering the cost factor for each of the possible routes based on a total distance of the predefined segments covered by the capacity links defining each possible route.

25. The method of claim 13, wherein the service request specifies intermediate locations through which the communication line must pass between the source location and the destination location, the identifying act comprising:
defining an intermediate node corresponding to each intermediate location specified by the service request; and
limiting the possible capacity links to capacity links within the communication network that may be joined between adjacent intermediate nodes, a first intermediate node and the source node and a final intermediate node and the destination node.

26. A computer program product readable by a computing system and encoding a computer program of instruction for executing a computer process for designing a route in a communication network through which a communication line may be installed between a source location and a destination location as specified in a service request for the communication line, said computer process comprising:
identifying one or more possible capacity links within the communication network, wherein each capacity link represents an ability to transport data over a predefined segment of the communication network between the source location and the destination location;
building a capacity graph of the communication network depicting connectivity of each of the possible capacity link to an adjacent possible capacity link such that one or more possible routes are defined between a source node representing the source location and a destination node representing the destination location;
calculating a cost factor for each possible capacity link within the communication network; and
selecting an optimal route from the possible routes based on the calculated cost factor for each possible link.

27. The computer process in the computer program product of claim 26, wherein the calculating act comprises:
applying a routing algorithm to the capacity graph.

28. The computer process in the computer program product of claim 26, wherein the identifying step comprises:
retrieving a route policy for the communication line specifying routing rules based on a given service type of the service request and bandwidth required for installation of the communication line; and invoking the route policy to identify only possible capacity links that satisfy the routing rules.

29. The computer process in the computer program product of claim 26, wherein the selecting act comprises:

selecting a source network element for connecting the source node to a first customer demarcation located at the source location; and selecting a destination network element for connecting the destination node to a second customer demarcation located at the destination location.

30. The computer process in the computer program product of claim 29, wherein the computer process further comprises:

testing whether the source network element contains an incoming egress port for connecting to the first customer demarcation; and testing whether the destination network element contains an outgoing egress port for connecting to the second customer demarcation.

31. The computer process in the computer program product of claim 30, wherein the computer process further comprises:

if the source network element does not contain an incoming egress port, repeating the selecting act to select a subsequent source network element; and if the destination network element does not contain an outgoing egress port, repeating the selecting act to select a subsequent destination network element.

32. The computer process in the computer program product of claim 26, wherein the identifying act comprising:

defining an intermediate node corresponding to each intermediate location specified by the service request; and limiting the possible capacity links to capacity links within the communication network that may be joined between adjacent intermediate nodes, a first intermediate node and the source node and a final intermediate node and the destination node.

* * * * *